United States Patent
Huang et al.

(10) Patent No.: US 9,372,622 B2
(45) Date of Patent: Jun. 21, 2016

(54) METHOD FOR RECORDING A TRACK AND ELECTRONIC DEVICE USING THE SAME

(71) Applicants: Ren-Jiun Huang, Taipei (TW); Chen-Hua Li, Taipei (TW)

(72) Inventors: Ren-Jiun Huang, Taipei (TW); Chen-Hua Li, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 378 days.

(21) Appl. No.: 14/146,737

(22) Filed: Jan. 3, 2014

(65) Prior Publication Data

US 2014/0223386 A1  Aug. 7, 2014

Related U.S. Application Data

(60) Provisional application No. 61/761,713, filed on Feb. 7, 2013.

(30) Foreign Application Priority Data

Nov. 11, 2013  (TW) .............................. 102140900 A (51) Int. Cl.
| | | |
|---|---|---|
| *G06F 3/0488* | (2013.01) | |
| *G06F 3/0483* | (2013.01) | |
| *G06F 3/0487* | (2013.01) | |
| *G06F 17/24* | (2006.01) | |
| *G06T 11/00* | (2006.01) | |
| *G06F 3/0484* | (2013.01) | |

(52) U.S. Cl.
CPC ........ *G06F 3/04883* (2013.01); *G06F 3/04845* (2013.01); *G06T 11/00* (2013.01); *G06F 3/0483* (2013.01); *G06F 3/0487* (2013.01); *G06F 3/0488* (2013.01); *G06F 3/04886* (2013.01); *G06F 17/241* (2013.01)

(58) Field of Classification Search
CPC ............ G06F 3/04883; G06F 3/04845; G06F 3/0483; G06F 3/0487; G06F 3/0488; G06F 3/04886; G06F 17/241; G06T 11/00
See application file for complete search history.

(56) References Cited

U.S. PATENT DOCUMENTS

| | | | |
|---|---|---|---|
| 6,661,529 B2 | 12/2003 | Sanbongi et al. | |
| 7,015,401 B2 | 3/2006 | Yeh | |
| 8,555,198 B2 * | 10/2013 | Beezer et al. | 715/802 |
| 2001/0019420 A1 | 9/2001 | Sanbongi et al. | |
| 2008/0104503 A1 * | 5/2008 | Beall et al. | 715/233 |
| 2011/0157031 A1 * | 6/2011 | Liu | 345/173 |

FOREIGN PATENT DOCUMENTS

| | | |
|---|---|---|
| CN | 201000588 | 1/2008 |
| CN | 102109949 | 6/2011 |
| TW | 395112 | 6/2000 |

* cited by examiner

*Primary Examiner* — Ting Lee
(74) *Attorney, Agent, or Firm* — Jianq Chyun IP Office (57) ABSTRACT

A method for recording a track and an electronic device using the same are provided. When the electronic device loads an operation system, the recording module is automatically enabled and enters a standby state. When a display unit of the electronic device displays an operating interface and the recording module is triggered, the recording module is switched from the standby state to an active state. When the recording module is at the active state, a drawing layer is displayed and covers the operating interface, and an input track is received via the drawing layer. When a storing command is received, the input track is stored to obtain a composite image.

16 Claims, 5 Drawing Sheets

METHOD FOR RECORDING A TRACK AND ELECTRONIC DEVICE USING THE SAME

CROSS-REFERENCE TO RELATED APPLICATION

This application claims the priority benefits of U.S. provisional application Ser. No. 61/761,713, filed on Feb. 7, 2013 and Taiwan application serial no. 102140900, filed on Nov. 11, 2013. The entirety of each of the above-mentioned patent applications is hereby incorporated by reference herein and made a part of this specification.

BACKGROUND OF THE INVENTION

1. Field of the Invention

The invention relates to a method for recording a track and an electronic device using the same and, more particularly, to a method for recording a handwriting track and an electronic device using the same.

2. Description of the Related Art

As science technology develops, paper data are gradually converted to electronic data. Since electronic data are easy to be stored and carried, and are more convenient to be searched than conventional books, nowadays, it is popular to use an electronic device to record data, provide a memo, or even draw figures. For example, when the user is in class or in a meeting, an electronic device (such as a notebook computer) is only needed instead of a conventional note paper for recording important information or making notes.

However, in a conventional electronic notebook application program, the user needs to switch the executing program window and open another window of a relating application program to edit files. If the user wants to add a comment to an image of the current executing program, the image has to be captured by screenshot first, and the captured image is imported to an application program of the electronic notebook and thus can be edited by users. The process is too complicated and inconvenient for the user.

BRIEF SUMMARY OF THE INVENTION

A method for recording a track and an electronic device using the same are provided. The electronic device can add a comment instantly to an operating interface, which improves the convenience of recording or making notes.

A method for recording a track is applied to an electronic device. The method includes following steps: enabling a recording module automatically to enter a standby state when the electronic device loads an operation system; switching the recording module from the standby state to an active state when a display unit of the electronic device displays an operating interface and the recording module is determined to be triggered; displaying a drawing layer when the recording module is at the active state, wherein the drawing layer covers the operating interface; receiving an input track via the drawing layer; and saving the input track to obtain a composite image when a storing command is received.

An electronic device includes a display unit, a storage unit, a processing unit and a recording module. The processing unit is coupled to the display unit and the storage unit, loads an operation system and displays an operating interface at the display unit. The recording module is coupled to the processing unit. When the operation system boots, the processing unit enables the recording module to make the recording module enter a standby state. The recording module includes a state switching module, a layer control module, a receiving module and a storage module. The state switching module switches the recording module from the standby state to an active state when the display unit displays the operating interface and the recording module is determined to be triggered. The layer control module displays a drawing layer when the recording module is at the active state, wherein the drawing layer covers the operating interface. The receiving module receives an input track via the drawing layer. The storage module stores the input track when a storing command is received to obtain a composite image.

As stated above, the recording module can be triggered any time, and comments can be written on via the drawing layer, which improves the convenience of handwriting.

These and other features, aspects and advantages of the present invention will become better understood with regard to the following description, appended claims, and accompanying drawings.

DETAILED DESCRIPTION OF THE EMBODIMENTS

Figure 1A:
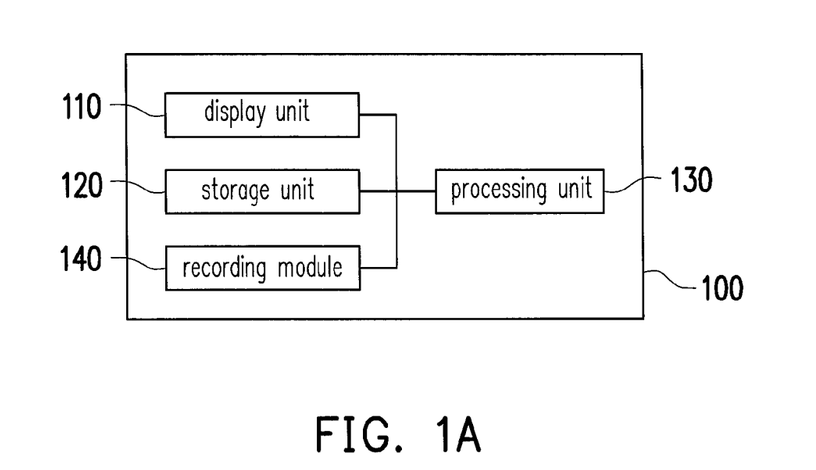
FIG. 1A is a block diagram showing an electronic device in an embodiment.

FIG. 1A is a block diagram showing an electronic device in an embodiment. Please refer to FIG. 1A, the electronic device 100 may be a desktop computer, a notebook computer, a tablet computer, a smart phone or any other device having a computing function. The electronic device 100 includes at least a display unit 110, a storage unit 120, a processing unit 130 and a recording module 140. The processing unit 130 is coupled to the display unit 110, the storage unit 120, and the recording module 140.

The display unit 110 may be a cathode ray tube (CRT) display, a liquid crystal display (LCD), a plasma display or a touch control display. The touch control display may include a capacitive screen, a resistive screen, a fluctuating screen or any other screen which can provide a touch control function by themselves or other components after coupling.

The storage unit 120 may be a non-volatile memory (NVM), a dynamic random access memory (DRAM) or a static random access memory (SRAM), which is not limited herein.

The processing unit 130 may be a central processing unit (CPU) or a microprocessor, and it processes data in hardware, firmware and software of the electronic device 100.

The recording module 140 may be a chip including one or more digital logic gates, or a code segment written in a computer programming language. For example, if the recording module 140 is achieved by digital logic gates, the recording module 140 is coupled to the processing unit 130 and is driven by the processing unit 130. If the recording module 140 is achieved by code segments, the recording module 140 is stored in the storage unit 120. After the code segments of the recording module 140 are installed, they are executed by the processing unit 130. The code segments include multiple commands, and the processing unit 130 executes the steps of the input track recording method via the commands. In the embodiment, the electronic device 100 only includes one processing unit 130, and in other embodiments, the electronic device 100 may include a plurality of the processing units, and the processing units execute the installed code segments.

Figure 1B:
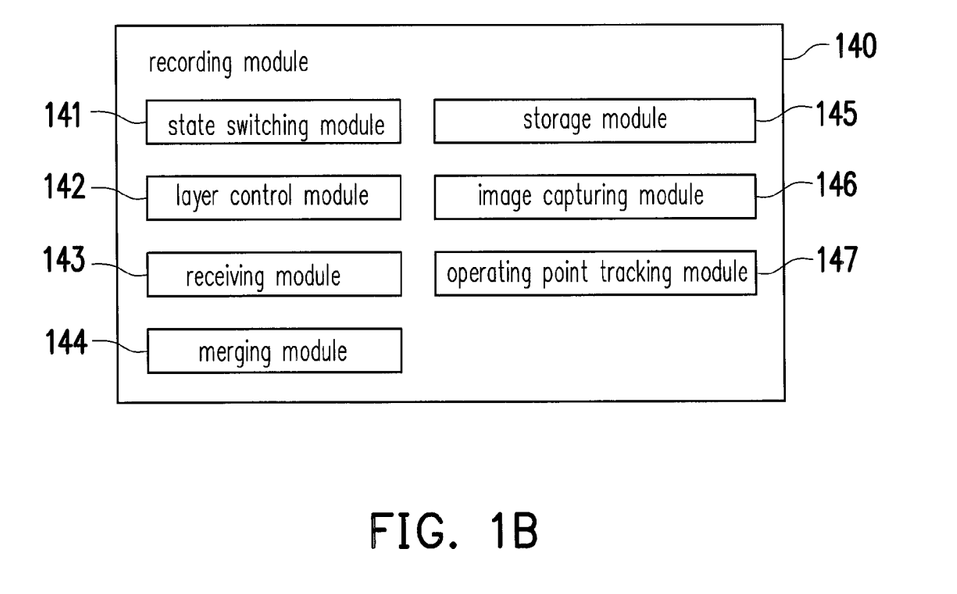
FIG. 1B is a block diagram showing a recording module in an embodiment.

The recording module 140 may further include multiple modules. For example, FIG. 1B is a block diagram showing the recording module in an embodiment. Please refer to FIG. 1B, the recording module 140 mainly includes a state switching module 141, a layer control module 142, a receiving module 143 and a storage module 145, and it may further include a merging module 144, an image capturing module 146 and an operating point tracking module 147.

The state switching module 141 switches the recording module 140 between an active state and a standby state. The layer control module 142 controls the displaying of a drawing layer. The receiving module 143 receives an input track via the drawing layer. The merging module 144 merges the input track and a captured image (such as a captured operating interface) to obtain a composite image. The storage module 145 stores the composite image to the storage unit 120. The image capturing module 146 captures an operating interface to obtain the captured image. The operating point tracking module 147 tracks an operating point at the display unit 110. The operating point may be a cursor or a touch point when a finger or a stylus touches the display unit 110. When the display unit 110 receives a signal (such as a triggering signal), the layer control module 142 generates the operating point and controls the range of the drawing layer via the operating point.

Figure 2:
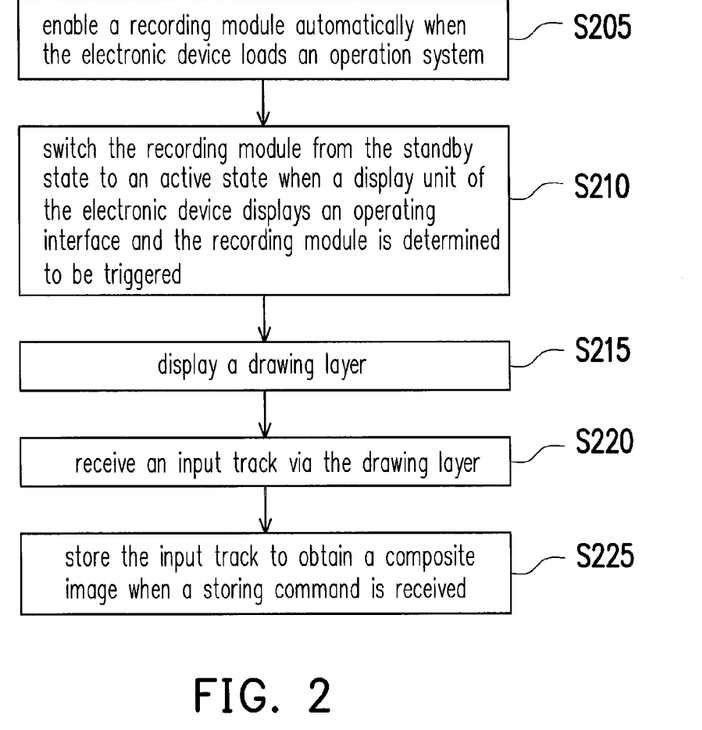
FIG. 2 is a flow chart showing a method for recording an input track in an embodiment.

The steps of the method for recording the input track are illustrated with the electronic device 100 as follows. FIG. 2 is a flow chart showing the method for recording an input track in an embodiment. In the embodiment, in order to illustrate more conveniently, the display unit 110 is a touch control screen as an example. In other embodiments, the display unit 110 may also be a display without a touch control function, which is not limited herein.

Please refer to FIG. 1A, FIG. 1B and FIG. 2, in the step S205, when the electronic device 100 loads the operation system, the processing unit 130 automatically enables the recording module 140 to make the recording module 140 enter the standby state.

In the step S210, when the display unit 110 of the electronic device 100 displays the operating interface and the processing unit 130 determines the recording module 140 is triggered, the state switching module 141 switches the recording module 140 from the standby state to the active state. For example, when the electronic device 100 opens an application program or the electronic device 100 displays the desktop, the recording module 140 is triggered. Moreover, if the electronic device 100 opens an application program already, when the processing unit 130 determines the recording module 140 is triggered, the processing unit 130 pauses the application program executed by the electronic device 100 to avoid an error in the operation of the application program.

The triggering of the recording module 140 is illustrated with an example as follows. For example, a triggering area can be set at the display unit 110, and when an operating interface is displayed and the processing unit 130 detects the triggering area receives a triggering signal, the processing unit 130 determines the recording module 140 is triggered. The triggering area may be a visible virtual key or a hidden area. For example, a virtual key can be displayed anytime at a specific position at the display unit 110. In another example, under a normal state, the triggering area is hidden and is not displayed. When the user moves a finger, a stylus or a cursor to a specific position at the display unit 110, the triggering area appears. When the triggering area receives the triggering signal (for example, the triggering area is pressed), the state switching module 141 switches the recording module 140 from the standby state to the active state.

Then, in the step S215, when the recording module 140 is at the active state, the layer control module 142 displays the drawing layer. In the embodiment, the drawing layer covers the operating interface. The drawing layer may be a transparent layer, a translucent layer or an opaque layer. In the embodiment, the layer control module 142 can directly display the drawing layer above the operating interface, or the layer control module 142 displays the drawing layer as it can be pulled out.

Figure 3:
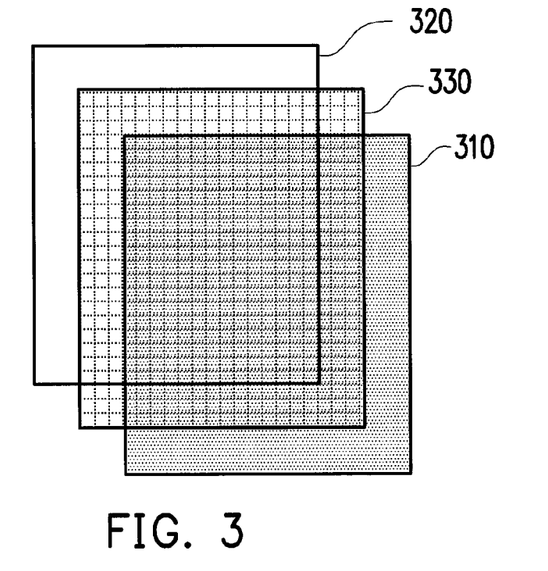
FIG. 3 is a schematic diagram showing layers in an embodiment.

Furthermore, in order to facilitate drawing or handwriting, a grid layer is displayed between the drawing layer and the operating interface. For example, FIG. 3 is a schematic diagram showing the layers in an embodiment. Please refer to FIG. 3, in the embodiment, the top layer is the drawing layer 320 for receiving drawing or handwriting from the user, the layer below the drawing layer 320 is the grid layer 330, and the bottom layer is the operating interface 310.

When the recording module 140 is triggered and is switched to the active state, the drawing layer 320 is displayed above the operating interface 310, and the grid layer 330 is displayed between the drawing layer 320 and the operating interface 310. In the embodiment, the drawing layer 320 is a transparent layer, and the grid layer 330 is a translucent layer. Thus, when the drawing layer 320 and the grid layer 330 cover the operating interface 310, the user can still see the content of the operating interface 310 clearly.

The operating interface may also be a scrollable image. When the drawing layer is displayed, the layer control module 142 can extend the drawing layer along a scrolling direction while the operating interface scrolls.

In the step S220, the receiving module 143 receives an input track via the drawing layer. For example, if the display unit 110 is a touch control screen, after the drawing layer is displayed, the user can draw by a finger or a stylus at the display unit 110. If the display unit 110 is not a touch control screen, after the drawing layer is displayed, the user can use an input device, such as a mouse, to control the cursor at the display unit 110 to draw.

In the step S225, when the processing unit 130 receives a storing command, the storage module 145 stores the input track to obtain a composite image. Moreover, the merging module 144 can also merge the input track and a background layer to obtain the composite image. The background layer may be a captured image, a white image or a transparent layer. The captured image is obtained by capturing an operating interface. The captured image may be captured at the time when it is determined that the recording module 140 is triggered or the storing command is received.

For example, when the drawing layer is displayed, a tool bar is displayed at the upper area (or other positions) of the drawing layer, and the tool bar includes various functions. When a saving function in the tool bar is enabled, a storing command is sent out, and the merging module 144 merges the input track at the drawing layer 320 and a background layer to obtain the composite image. Then, the storage module 145 stores the composite image to the storage unit 120.

Practically, the tool bar of the drawing layer may include a first saving key, a second saving key and a third saving key. Before the drawing layer is displayed, the image of the display unit 110 includes an operating interface of the application program and a status bar. After the drawing layer is displayed, the operating interface of the application program becomes the background. When the user presses the first saving key of the tool bar at the drawing layer, the recording module 140 embeds the captured operating interface to the drawing layer as a background. Thus, the user can draw on the drawing layer. When the user wants to store or share the drawing, he or she obtains a composite image of the input track and the captured image. When the application program is an electronic map, the recording module 140 can be used to add marks on the electronic map. When the application program is an electronic document, the recording module 140 can also be used to add important hints on the electronic document. When the user presses a specific function key of the tool bar at the drawing layer, the drawing layer is removed, and the user can see the operating interface of the application program again.

When the user presses the second saving key of the tool bar at the drawing layer, the recording module 140 only stores the input track but not merge the input track and the background layer (which is the captured image from the operating interface). For example, the recording module 140 can be used to execute a drawing tracing function. That means, the user traces the operating interface (such as a specific pattern) at the drawing layer, and then only stores the input tracing track and does not store the operating interface at the bottom.

When the user presses the third saving key of the tool bar at the drawing layer, the recording module 140 takes a white image (or another default image) as the background layer, and merges the white image and the input track, just like a memo or an electronic notebook function. For example, when the user wants to take a note when the application program is executed, the recording module 140 is triggered and the user can write on the drawing layer. Then, the user presses the third saving key, and the default image (which is regarded as the background layer) and the input track are merged.

The captured image is captured from the current operating interface of the electronic device 100 by the image capturing module 146 when the recording module 140 is determined to be triggered. The captured image may also be captured from the current operating interface of the electronic device 100 by the image capturing module 146 when the storing command is received.

For example, if the operating interface is a static image, it is set that the image capturing module 146 captures the current operating interface when the recording module 140 is triggered. Moreover, if the operating interface is a dynamic image (such as a movie in playing), it is set that the image capturing module 146 captures the current operating interface when the storing command is received. That means, the user can record needed data when a movie is playing. The previous embodiments are just examples, which can be set according to requirements in practical use and is not limited herein.

The process of controlling the drawing layer is illustrated with an example as follows. FIG. 4A to FIG. 4D are schematic diagrams showing a process of quick handwriting at the electronic device. Please refer to FIG. 4A to FIG. 4D, the electronic device 100 is a smart phone, the display unit 110 is a touch control screen, and a stylus 410 is used to touch and operate.

Figure 4A:
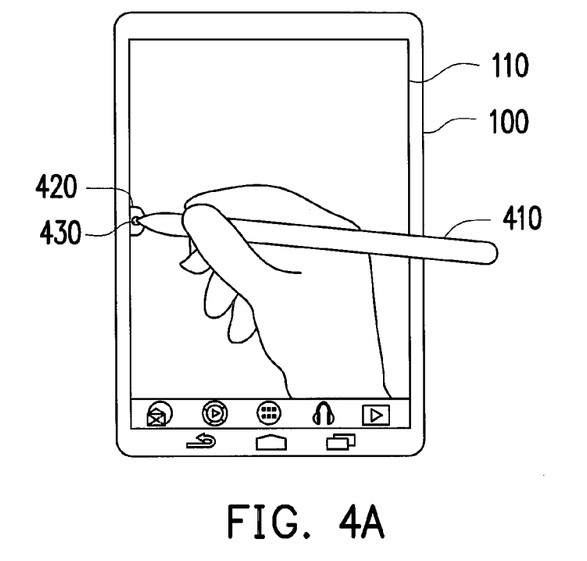
FIG. 4A to FIG. 4D are schematic diagrams showing a process of quick handwriting at an electronic device.

In the embodiment, the display unit 110 of the electronic device 100 displays the operating interface (for example, the electronic device 100 is not at a power saving mode), and a triggering area 420 is set. As shown in FIG. 4A, when the user uses the stylus 410 to touch the triggering area 420, the recording module 140 is switched to the active state, and the layer control module 142 generates an operating point 430 at a place where the triggering signal is received at the display unit 110 (that is a place where the stylus 410 touches at the display unit 110). Then, the operating point tracking module 147 detects the moving of the operating point 430.

Figure 4B:
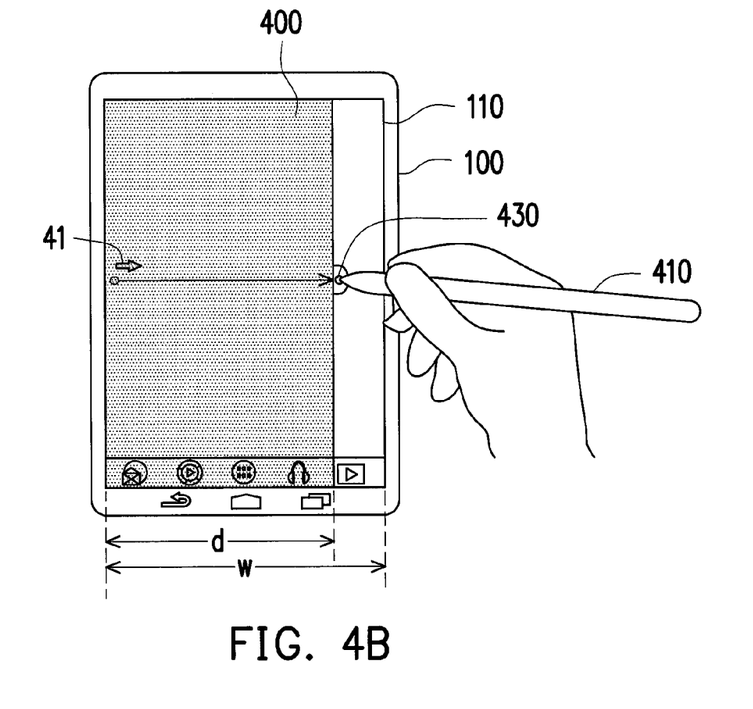

When the operating point tracking module 147 detects a displacement of the operating point 430 along the specific direction 41, the layer control module 142 gradually increases the range of the drawing layer 400 (which is shown as a dot area in FIG. 4B). When the displacement of the operating point 430 along the specific direction 41 is larger than a predetermined distance and the operating point 430 is released (which means the stylus 410 leaves the display unit 110), the layer control module 142 displays all the drawing layer 400 to cover the operating interface completely.

In the embodiment, the specific direction 41 is set as a direction from left to right, and the predetermined distance is half of the width "w" of the display unit 110. The displacement of the operating point 430 from a position shown in FIG. 4A to another position shown in FIG. 4B is "d". It is assumed that when the operating point 430 moves to the position shown in FIG. 4B and the operating point 430 is detected to be released, since "d" is larger than "w/2", the layer control module 142 displays all the drawing layer 400 at the display unit 110. That means, after the stylus 410 is moved from a position shown in FIG. 4A to another position shown in FIG. 4B and the stylus 410 is taken away from the display unit 110, and the drawing layer 400 covers the operating interface as shown in FIG. 4C.

On the other hand, when the displacement of the operating point 430 along the specific direction 41 is not larger than the predetermined distance, and the operating point is released, the layer control module 142 cancels the displaying of the drawing layer 400.

Figure 4C:
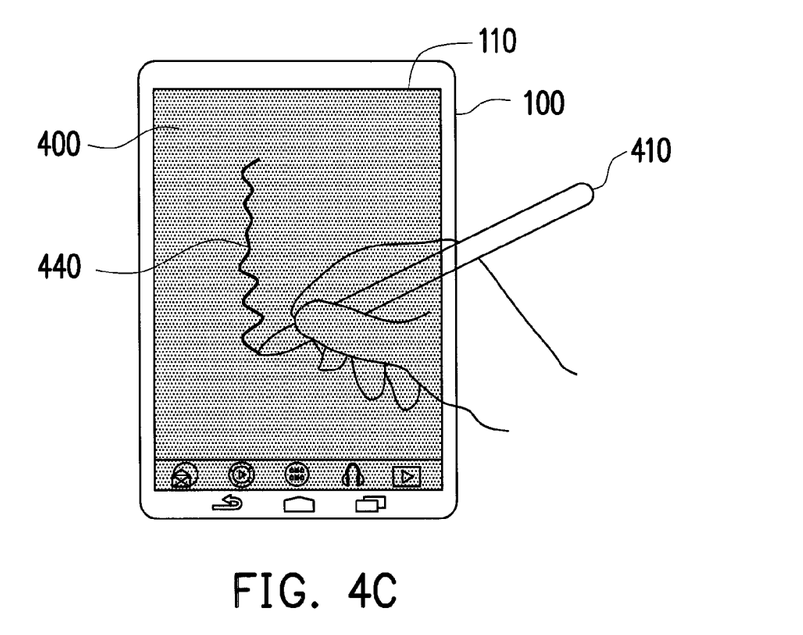

In FIG. 4C, the stylus 410 is used to draw at the drawing layer 400 and the input track 440 is thus generated.

Figure 4D:
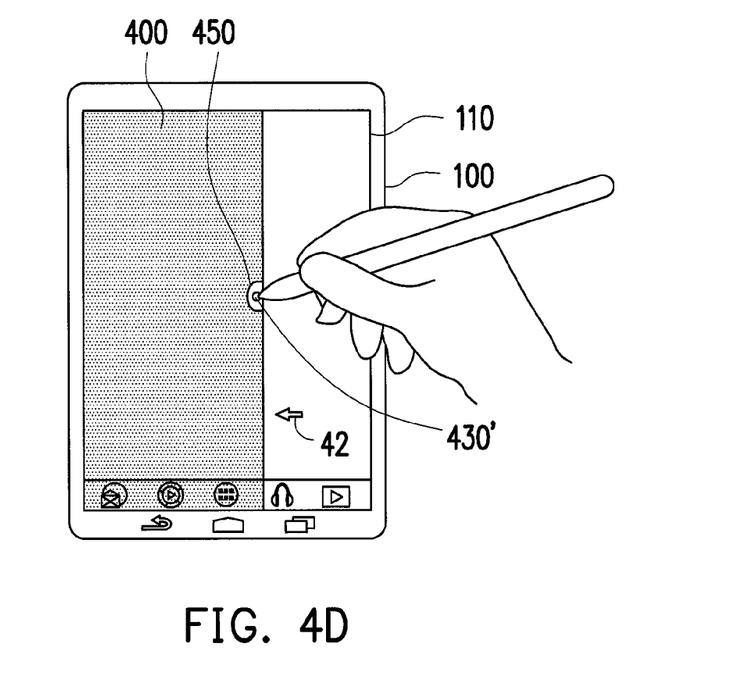

Moreover, the step of closing the drawing layer 400 is shown in FIG. 4D. The drawing layer 400 can be closed by pushing it along a retracting direction 42 which is opposite to the specific direction 41. For example, after all the drawing layer 400 is pulled out along the specific direction 41, the triggering area 420 disappears, and a closing area 450 appears (as shown in FIG. 4D). When the drawing layer 400 is displayed and the stylus 410 is detected touching the closing area 450, an operating point 430' is generated. After the stylus 410 moves a specified distance along the retracting direction 42, the operating point 430' is released, and the layer control module 142 cancels the displaying of the drawing layer 400. The embodiment shown in FIG. 4A to FIG. 4D is an example, which can be adjusted according to practical requirements.

Furthermore, a call function can be equipped in the electronic device 100. In an embodiment, when a call is received, the recording module 140 is paused, and when the call ends, the recording module 140 is enabled again.

Figure 5:
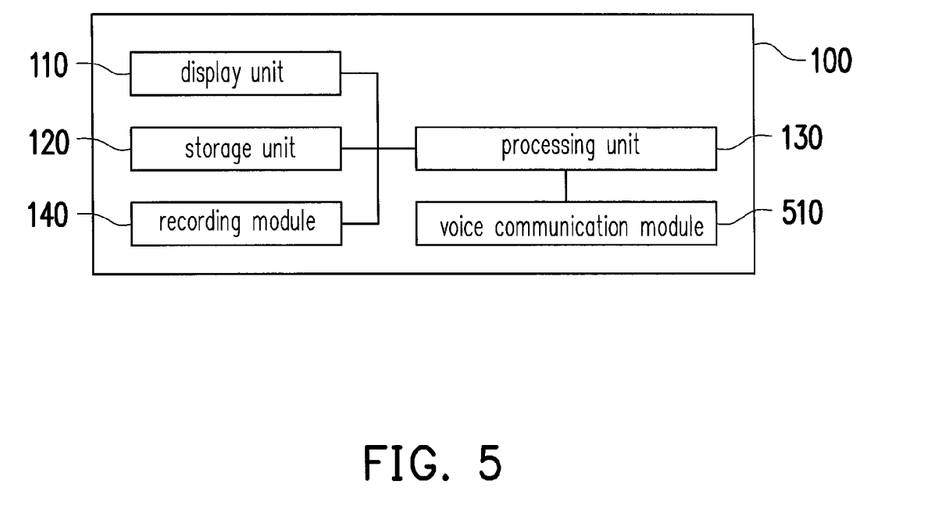
FIG. 5 is a block diagram showing an electronic device which has a call function in an embodiment.

FIG. 5 is a block diagram showing an electronic device which equipped a call function in an embodiment. In the embodiment, the same symbols denote the components which have the same functions as those in the electronic device 100, and relating illustration is omitted herein. Please refer to FIG. 5, the electronic device 500 further includes a voice communication module 510. The voice communication module 510 is used to send and receive a voice communication signal, generate a call notification signal when a call is received, and generate a call end signal when the call ends.

When the voice communication module 510 receives the call notification signal, the recording module 140 stores the input track via the storage module 145 temporarily, and the state switching module 141 switches the recording module 140 from the active state to the standby state. Thus, the layer control module 142 cancels the displaying of the drawing layer, and the voice communication module 510 opens a call interface.

When the recording module 140 receives the call end signal from the voice communication module 510, the state switching module 141 switches the recording module 140 from the standby state to the active state. Thus, the layer control module 142 displays the drawing layer again, and the voice communication module 510 closes the call interface. The redisplayed drawing layer includes the input track which is temporarily stored in advance.

That means, when the user draws on the drawing layer and a phone call is received at the time, the displaying of the drawing layer can be temporarily cancelled, and the image of the display unit 110 is switched to the call interface. When the call ends, the image of the display unit 110 is automatically switched to the drawing layer which includes the previous input track.

According to the embodiments described above, the recording module can be triggered any time to display the drawing layer for information input. Consequently, when the user needs to take a note instantly, the recording module is triggered to display the drawing layer and write in anytime. In the disclosure, no application program under execution has to be switched to open another program for making notes, and nor to capture the operating interface first and import it to other tools for editing, which is more convenient, more rapid and more user-friendly in use.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A method for recording a track, applied to an electronic device, the method comprising the following steps:
enabling a recording module automatically to enter a standby state when the electronic device loads an operating system;
switching the recording module from the standby state to an active state when a display unit of the electronic device displays an operating interface and the recording module is determined to be triggered;
displaying a drawing layer when the recording module is at the active state, wherein the drawing layer covers the operating interface;
receiving an input track via the drawing the layer; and
saving the input track to obtain a composite image when a storing command is received,
wherein when the display unit of the electronic device displays the operating interface, the method further includes:
determining the recording module is triggered when a triggering area of the display unit receives a triggering signal,
wherein when the recording module is at the active state, the method further includes:
generating an operating point at a position where the display unit receives the triggering signal;
increasing a range of the drawing layer gradually when the operating point makes a displacement along a specific direction;
displaying all the drawing layer to cover the operating interface completely when the displacement is larger than a predetermined distance and the operating point is release; and
cancelling the displaying of the drawing layer when the displacement is not larger than the predetermined distance and the operating point is released.

2. The method according to claim 1, wherein the step of saving the input track to obtain the composite image when the storing command is received includes:
merging the input track and a background layer to obtain the composite image.

3. The method according to claim 2, wherein the background layer is one of a captured image, a white image and a transparent layer;
wherein when the recording module is determined to be triggered or the storing command is received, the operating interface of the electronic device is captured to obtain the captured image.

4. The method according to claim 1, wherein the operating interface is a scrollable image, and the step of displaying the drawing layer further includes:
extending the drawing layer along a scrolling direction while the operating interface scrolls.

5. The method according to claim 1, wherein the method further includes:
receiving a call notification signal when the drawing layer receives the input track, including:
saving the input track temporarily;
switching the recording module from the active state to the standby state to cancel the displaying of the drawing layer temporarily; and
opening a call interface; and
receiving a call end signal, wherein the step includes:
closing the call interface; and
switching the recording module from the standby state to the active state to display the drawing layer again, wherein the drawing layer includes the input track which is stored temporarily in advance.

6. The method according to claim 1, wherein the step of displaying the drawing layer further includes:
displaying a grid layer between the drawing layer and the operating interface.

7. The method according to claim 1, wherein when the recording module is determined to be triggered, an application program which is executed by the electronic device is suspended.

8. The method according to claim 1, wherein the drawing layer is one of a transparent layer, a translucent layer and an opaque layer, and the operating interface is a dynamic image or a static image.

9. An electronic device, comprising:
a display unit;
a storage unit;
a processing unit coupled to the display unit and the storage unit, loading an operation system and displaying an operating interface at the display unit; and
a recording module coupled to the processing unit, wherein when the operation system boots, the processing unit enables the recording module to make the recording module enter a standby state, and the recording module includes:
a state switching module switching the recording module from the standby state to an active state when the display unit displays the operating interface and the recording module is determined to be triggered;

a layer control module displaying a drawing layer when the recording module is at the active state, wherein the drawing layer covers the operating interface;

a receiving module receiving an input track via the drawing layer; and a storage module saving the input track when a storing command is received to obtain a composite image, wherein when the state switching module receives a triggering signal from a triggering area of the display unit, the recording module is determined to be triggered, wherein the layer control module generates an operating point at a place where the triggering signal is received at the display unit, and a range of the drawing layer is increased gradually when the operating point makes a displacement along a specific direction, and the recording module further includes an operating point tracking module detecting the moving of the operating point, wherein when the operating point tracking module detects that the displacement is larger than a predetermined distance and the operating point is released, the layer control module displays all the drawing layer to cover the operating interface completely, and when the operating point tracking module detects that the displacement is not larger than the predetermined distance and the operating point is released, the layer control module cancels the displaying of the drawing layer.

10. The electronic device according to claim 9, wherein the recording module further includes:

a merging module merging the input track and a background layer to obtain the composite image.

11. The electronic device according to claim 10, wherein the background layer is one of a captured image, a white image and a transparent layer, and the recording module further includes:

an image capturing module capturing the current operating interface of the electronic device to obtain the captured image when the recording module is determined to be triggered or the storing command is received.

12. The electronic device according to claim 9, wherein the operating interface is a scrollable image, and the layer control module extends the drawing layer along a scrolling direction while the operating interface scrolls.

13. The electronic device according to claim 9, wherein the electronic device further includes:

a voice communication module generating a call notification signal when a call is received and generating a call end signal when the call ends;

wherein when the recording module receives the call notification signal from the voice communication module, the recording module stores the input track temporarily, the state switching module switches the recording module from the active state to the standby state to make the layer control module cancel the displaying of the drawing layer temporarily, and the voice communication module opens a call interface;

wherein when the recording module receives the call end signal from the voice communication module, the state switching module switches the recording module from the standby state to the active state to make the layer control module display the drawing layer again, the drawing layer includes the input track which is stored temporarily in advance, and the voice communication module closes the call interface.

14. The electronic device according to claim 9, wherein the layer control module displays a grid layer between the drawing layer and the operating interface.

15. The electronic device according to claim 9, wherein when the recording module is determined to be triggered, the processing unit suspends an application program which is executed by the electronic device.

16. The electronic device according to claim 9, wherein the drawing layer is one of a transparent layer, a translucent layer and an opaque layer, and the operating interface is a dynamic image or a static image.

* * * * *